United States Patent [19]

Roth

[11] Patent Number: 5,041,055

[45] Date of Patent: Aug. 20, 1991

[54] APPARATUS AND METHOD FOR REMOVING SOFT TISSUE FROM BONES

[75] Inventor: Eldon Roth, Austin, Tex.

[73] Assignee: Freezing Machines, Inc., Austin, Tex.

[21] Appl. No.: 542,252

[22] Filed: Jun. 21, 1990

[51] Int. Cl.⁵ ............................................. A22C 17/04
[52] U.S. Cl. .................................. 452/140; 452/135; 452/138; 426/480
[58] Field of Search ....................... 452/140, 138, 135; 426/480

[56] References Cited

U.S. PATENT DOCUMENTS

| | | | |
|---|---|---|---|
| 2,784,446 | 6/1955 | Beatty | 452/140 |
| 2,858,222 | 9/1957 | Harris et al. | 452/139 |
| 3,089,775 | 5/1963 | Lindall | 452/140 |
| 3,248,752 | 5/1966 | Segur et al. | 45/140 |
| 3,331,096 | 7/1967 | Segur et al. | 452/140 |
| 3,364,518 | 1/1968 | Brown et al. | 452/140 |
| 3,471,299 | 10/1969 | Duckworth et al. | 452/138 |
| 3,478,385 | 11/1969 | Kaplan | 452/140 |
| 3,570,050 | 3/1971 | Draper et al. | 452/140 |
| 3,671,999 | 6/1972 | Downs | 452/140 |
| 3,722,032 | 3/1973 | Draper et al. | 452/140 |
| 3,741,772 | 6/1973 | McFarland | 452/138 |
| 3,906,118 | 9/1975 | McFarland | 452/138 |
| 4,042,176 | 8/1977 | Beck et al. | 452/138 |
| 4,186,216 | 1/1980 | Roth | 452/140 |
| 4,286,356 | 9/1981 | Wenstrom | 452/140 |
| 4,536,920 | 8/1985 | Amersfoort | 452/138 |

FOREIGN PATENT DOCUMENTS

| | | | |
|---|---|---|---|
| 0030131 | 6/1981 | European Pat. Off. | 452/138 |
| 638320 | 12/1978 | U.S.S.R. | 452/140 |

Primary Examiner—Willis Little
Attorney, Agent, or Firm—J. Nevin Shaffer, Jr.; Russell D. Culbertson

[57] ABSTRACT

An apparatus is provided for removing meat and other soft tissue from bones by pumping a separating material over the surfaces of the bones under a desired separating pressure. The pressure exerted on the surfaces of the bones by the separating material combined with the movement of the separating material across the bone surfaces tears away any soft tissue attached to the bones. The apparatus includes a separator housing, a series of screen openings formed in the separator housing and an arrangement for injecting a suitable separating material into the housing. The separating material and any removed soft tissue exit the housing through the screen openings while the bones are preferably conveyed to an outlet end of the separator housing where they are removed without interfering with the flow separating material out of the separator housing through the screen openings. In the preferred form of the invention the housing is sized to accommodate large bone pieces or substantially whole bones to minimize the introduction of bone particles into the soft tissue.

33 Claims, 4 Drawing Sheets

APPARATUS AND METHOD FOR REMOVING SOFT TISSUE FROM BONES

BACKGROUND OF THE INVENTION

This invention relates to an apparatus and method for removing meat from bones, and more particularly, to an apparatus and method for removing substantially all meat and other soft tissue from bones while leaving the bones substantially intact. The apparatus and method may be applied advantageously to recover any type of meat but is particularly useful in recovering beef or pork.

The process of producing commercial meat products from whole carcasses includes first removing larger cuts of meat manually with a knife or other suitable tool. This manual first step recovers the bulk of the meat from the carcass but leaves small amounts of meat attached to the remaining bones. Although these small amounts of meat may be removed from the bones and combined to produce commercial meat products, such small amounts cannot be removed economically by hand.

A number of techniques have been developed to recover the meat remaining on bones after the larger cuts have been removed manually. U.S. Pat. No. 3,722,032 to Draper et al. and U.S. Pat. No. 3,671,999 to Downs were both directed to devices for removing meat from bones using jets of liquid. Both of these patents taught mounting the bones or carcasses on a suitable conveyor and then conveying the bones or carcasses past a series of high pressure water jets that each acted as a knife to cut through the meat and separate the meat from the bone to which it was attached. However, meat or nutrients from the meat tended to dissolve in the water utilized in these water jet techniques and such dissolved meat and nutrients were themselves difficult to recover. The loss of nutrients to the water also lowered the quality of the recovered meat pieces.

U.S. Pat. No. 2,784,446 to Beatty was directed to a device that used steel shots to remove meat from bones. The shots were directed to impinge upon a carcass to blast away meat and other tissue remaining on the bones. The shots, however, not only themselves contaminated the meat removed from the carcass, but also broke the bones in the carcass to produce bone fragments that also contaminated the meat.

In the device disclosed in my U.S. Pat. No. 4,186,216, small frozen meat particles were accelerated to a relatively high velocity and then impinged against bones to remove meat remaining attached after the larger cuts were removed manually. The bones were contained in an impingement housing that was adapted to move the bones so as to expose their various surfaces to the streams of high velocity frozen meat particles. Although, this frozen meat particle impinging device solved the problem of having to introduce foreign substances into the meat being removed, the use of frozen meat particles raised new problems. Freezing the meat and producing the small particles was relatively expensive and subjected at least a portion of the recovered meat to freeze/thaw cycles that reduced the quality of the product.

U.S. Pat. No. 3,906,118 to McFarland was directed to a device for separating edible flesh from normally inedible components of poultry or fish. In the McFarland device, bones with meat attached thereto were first ground and the resulting ground material was then conveyed through a perforated conduit. As the ground material was conveyed through the perforated conduit, it was also compressed against the perforations to force the meat and other soft tissue therethrough, leaving most of the ground bone and other hard components to act as a filter mat against the perforations, and finally, to be conveyed the length of the conduit to a discharge end. The required compression was provided by either the conveying mechanism alone, or by introducing the ground bone and soft tissue into the perforated conduit under pressure in addition to the compression provided by the conveyor. However, the grinding and straining technique taught by McFarland allowed fine bone pieces and pieces of bone marrow to pass through the perforations along with the meat, and reduced the quality and marketability of the recovered meat. The reduced quality was particularly acute when the meat being processed was beef or pork.

SUMMARY OF THE INVENTION

It is an object of the invention to provide an apparatus for separating meat from bones that overcomes the above-mentioned problems and others associated with meat deboning devices. It is also an object of the invention to provide a method for economically removing meat from bones while maintaining the quality of the removed meat.

An apparatus according to the invention for removing soft tissue from bones, includes a separator housing, screening means associated with the separator housing, and injecting means. The separator housing is adapted for receiving bones having meat and other soft tissue attached thereto, and the screening means provide an exit from the separator housing adapted to allow the meat and other soft tissue to pass therethrough while retaining the bones in the housing. The injecting means is adapted to inject a separating material into the separator housing so that the material flows under a desired separating pressure over at least a portion of the bones contained in the separator housing and then exits the housing through the screening means. As the separating material flows over the surface of the bones in the separator housing, it tears or scours loose any pieces of meat and carries the loosened meat to the screening means to exit the housing.

The present invention utilizes the pressure exerted by the separating material on the bones in combination with the motion of the separating material as it flows over the surface of the bones to shear or tear the soft tissue from the bone surface. This is in contrast to the prior art liquid jet and particle impinging devices which utilized the impact force of an accelerated material to cut away soft tissue from the bone. The use of a pressurized separating material also contrasts with the separating method and device shown in the McFarland U.S. Pat. No. 3,906,118, which relied on compression to separate soft tissue from the bone and required that the bone be either pre-ground or ground inside the machine.

Although the main utility of the invention is in removing meat from bones, the separating material also loosens substantially all other soft tissue, such as fat, from the bones and carries the other soft tissue through the screens along with the meat. Additionally, other hard material, such as tendons, ligaments, cartilage, and gristle may accompany the bones in the separator housing and may be cleaned of meat and other soft tissue.

Although the separating material may be almost any material adapted to be pumped or otherwise conveyed into the housing under the desired separating pressure, the preferred separating material is rendered oil fats of the particular type of animal being processed. For example, when the apparatus is being used to separate beef from beef bones, the preferred separating material is tallow rendered from beef fat. When pork is being separated from pork bones the preferred separating material is lard rendered from pork fat. Unlike the water used in the liquid jet devices, rendered oil fat do not substantially affect the quality of the meat due to contact during the separating process. Furthermore, the consistency of rendered oil fat, and thus its ability to remove meat and other soft tissue from bones at a given separating pressure, may be increased by reducing its temperature below normal atmospheric temperature. Preferably, the oil fats are rendered from the material leaving the separator housing through the screening means and then recycled or reinjected through the separator housing.

In one preferred form, the soft tissue separating apparatus also includes compressing means for compressing the bones and soft tissue against the screening means formed in the housing. This compression of bone and soft tissue within the housing helps to separate the soft tissue from the bones by urging the soft tissue through the screens. Also, the compressing means serves to arrange the bones and soft tissue in a substantially continuous mass through which the separating material must flow to perform its soft tissue separating function.

Although the separating material may be injected to remove meat and other soft tissue from discrete batches of bones, the preferred form of the invention includes continuously conveying bones through the separator housing with a suitable conveyor as the separating material is continuously injected. As the bones pass through the separator housing, the separating material tears or scours the meat and other soft tissue from the bones leaving only the bones and other hard undesirable material to exit the housing at a suitable separator housing outlet. The removed meat and other soft tissue exits the housing through the screening means along with substantially all of the particular separating material being used.

In the preferred form of the invention, the separator housing comprises an elongated conduit having an inlet end and an outlet end. An inlet opening is formed in the inlet end of the separator housing through which the bones and other hard material having meat and other soft tissue attached thereto may be deposited into the housing. The outlet end includes an outlet opening through which the bones, tendons, ligaments, and other undesirable hard material may exit the housing after having substantially all of the meat and other soft tissue removed therefrom.

The screening means preferably comprises a series of openings formed through the separator housing wall in a central section of the separator housing. In one form of the invention the screening means may include two separate areas of screen openings, the screen openings having different sizes and spacings in the separate areas to allow different types of soft tissue to pass. Where the screen openings are small and widely spaced, only the relatively softer meat and other soft tissue may pass therethrough whereas the relatively tougher or heavier meat and other soft tissue require larger and more closely spaced screen openings. Although the screening means preferably comprises a series of screen openings, it may alternatively comprise a single opening or a small number of relatively large openings adapted to prevent only bones above a certain separating size to pass therethrough. In this form of the invention soft tissue will be separated from the bones above the separating size. The soft tissue and smaller bones that pass through the relatively large screen openings must then be passed through a second separator device according to the invention with smaller screen openings in order to complete the deboning process.

In order to help compress the bones and soft tissue into a substantially continuous mass of material and to prevent substantial amounts of the separating material from exiting the housing through the outlet opening in the continuous operation form of the invention, the apparatus includes flow restricting means associated with the outlet end of the separator housing. The flow restricting means preferably includes a bone exit housing adapted to receive bones and any other material exiting the separator housing at the outlet end, an outlet passage formed in the bone exit housing, and a flow controlling device in the outlet passage for restricting the flow of bones and other material out of the bone exit housing. As the separator is operated, bones and other material conveyed through the separator housing are allowed to build up in the bone exit housing using the flow controlling device to restrict the flow of bones and other material. The resulting thick mass of bones and other material serves to substantially block the flow of separating material through the housing outlet opening, and thus ensures that most of the separating material exits the separator housing through the screen openings.

In the preferred form of the invention, the compressing means also serves to convey material through the separator housing and comprises an elongated auger mounted longitudinally within the elongated separator housing. The auger is powered by a suitable motor and is adapted to rotate about its longitudinal axis to urge bones and other material deposited at the inlet end of the separator housing toward the outlet end of the housing. Also, the housing preferably has a circular cross-sectional shape and the auger includes a cutting edge formed on its helical periphery adapted to scrape across the screen openings formed in the separator housing. The cutting edge of the auger serves to remove fibrous material that periodically collects across the openings to block the flow of meat, other soft tissue, and separating material. One important advantage of the present invention is that the bones need not be, and preferably are not, ground or even substantially broken. Thus, in the preferred form of the invention, successive turns of the auger are spaced to accommodate substantially whole, uncut bones.

The separating material injecting means preferably includes a suitable pump to pump or otherwise convey separating material from a suitable separating material source to the separator housing through a suitable separating material conduit and one or more injection ports. The port or ports may be at any position along the length of the housing. In the currently preferred form of the invention, however, the injection ports are positioned near the outlet end of the separator housing and the screen openings are positioned in a central portion of the separator housing so that the separating material flows against the direction in which the bones and soft tissue are conveyed through the separator housing by the auger or other conveyor. Also, when an auger-type conveyor is used, the separating material conduit and injection ports are preferably formed in the auger.

Whether the separating material is the preferred rendered oil fats or another material, it is preferably recovered from the material exiting the separator housing through the screen openings and recycled through the separator housing. In one form of the invention, a hopper or other suitable screen outlet collecting means is positioned below each separate area of screen openings in position to collect meat, other soft tissue, and the separating material as it is forced through the screen openings. From each collecting hopper the material is conveyed to a separate separator device adapted to separate or extract the particular separating material from the meat and other soft tissue. Where the separating material is rendered oil fats, the separating step includes first heating the combined material to a temperature at which the meat, may be mechanically separated from separated fat and the injected oil fats by a suitable meat/fat separator. The meat from the meat/fat separator is removed for further processing into commercial products while at least a portion of the rendered fat is conditioned to remove bacteria carrying substances and preferably cooled to a desired consistency. The conditioned oil fat material is then pumped or otherwise conveyed under the desired separating pressure back into the separator housing through the separating material conduit and injection port or ports.

These and other objects, advantages, and features of the invention will be apparent from the following description of the preferred embodiments, considered along with the accompanying drawings.

DESCRIPTION OF THE PREFERRED EMBODIMENTS

Figure 1:
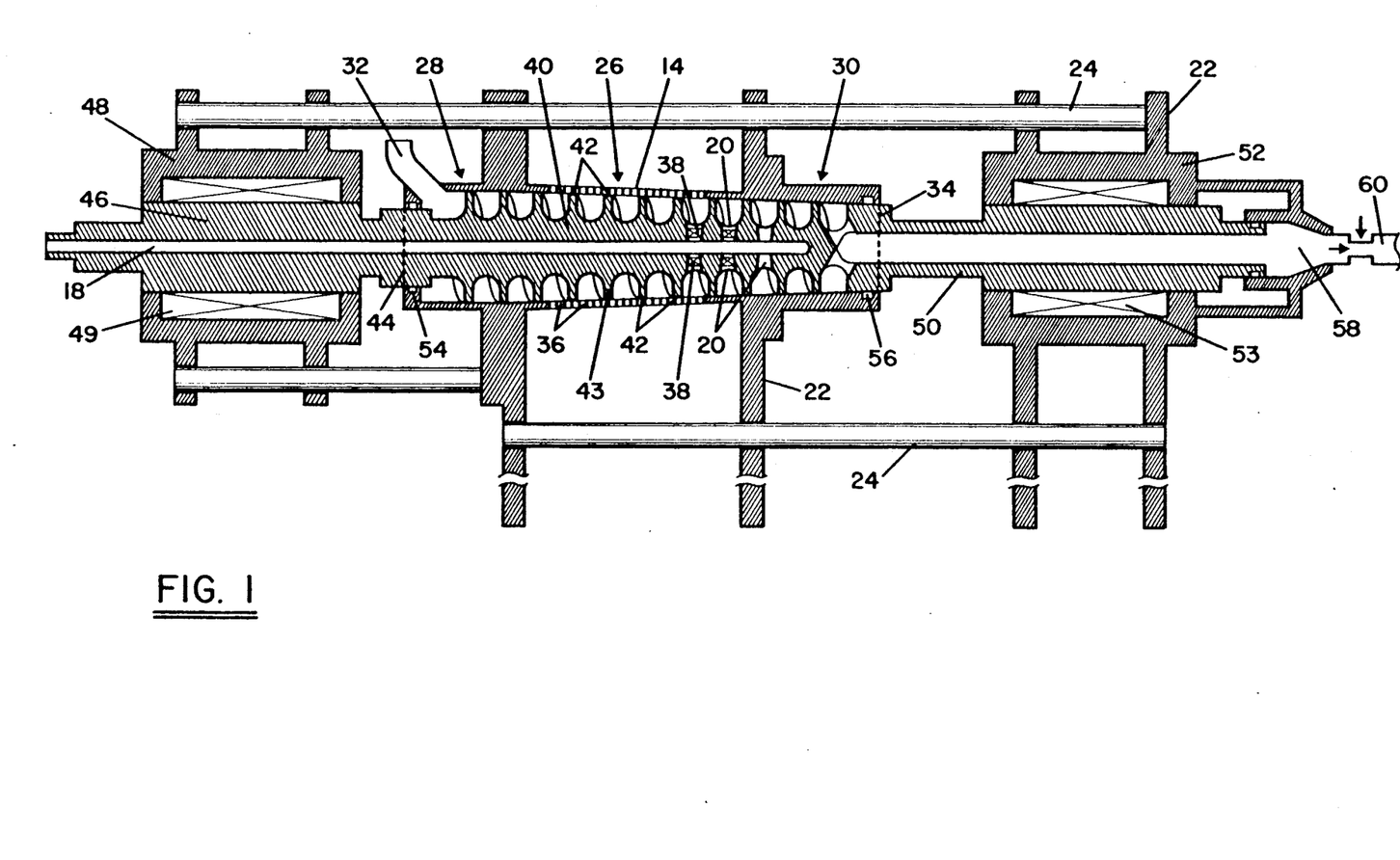
FIG. 1 is a partially schematic representational view in longitudinal section through the separator housing of a soft tissue separating apparatus embodying the principles of the invention.
Figure 2:
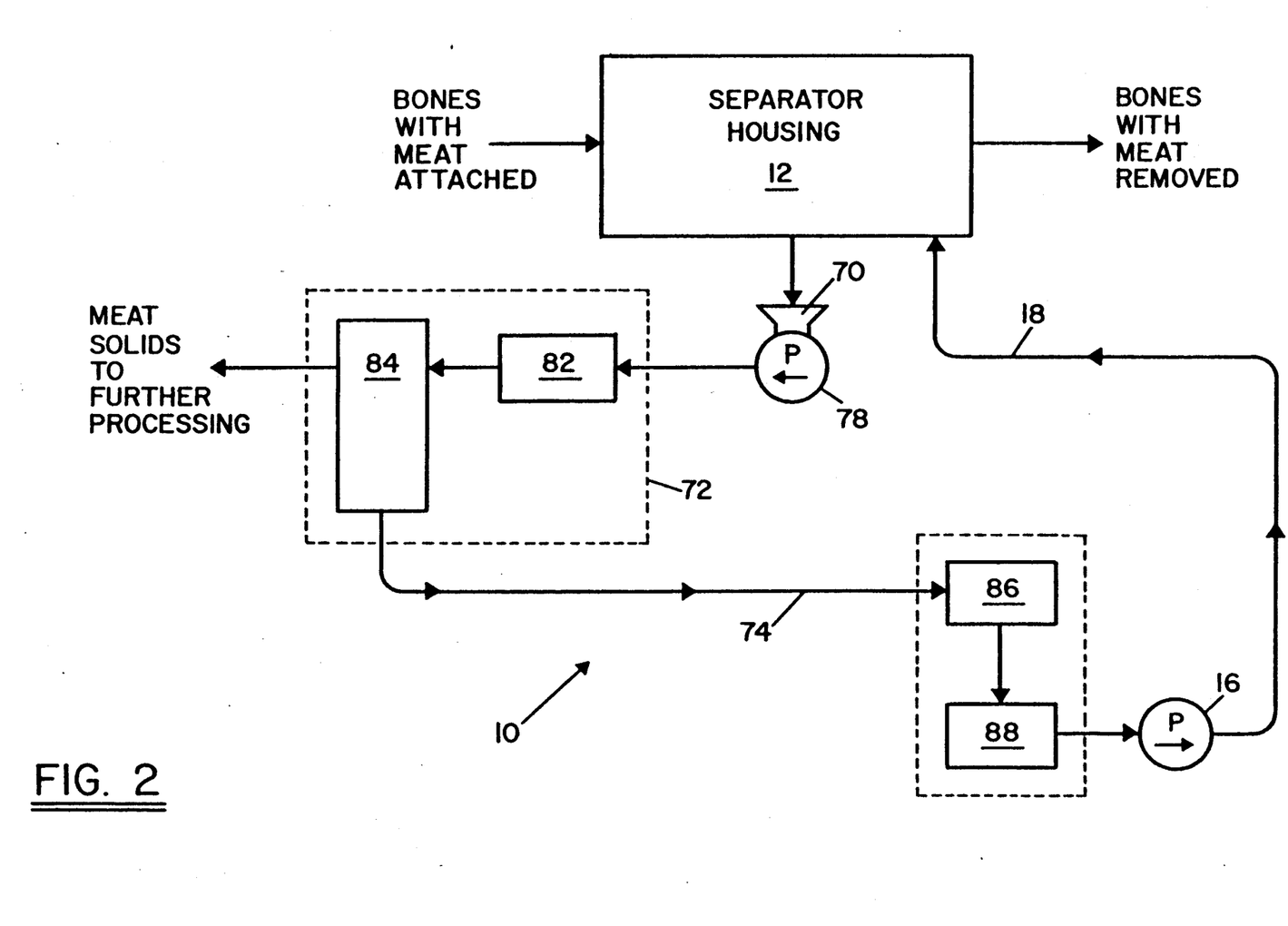
FIG. 2 is a schematic representation of a soft tissue separating apparatus embodying the principles of the invention and adapted for use with the separator housing illustrated in FIG. 1.

Referring to FIGS. 1 and 2, a soft tissue separating apparatus 10 embodying the principles of the invention includes a separator housing 12, screening means 14, and separating material injecting means including an injection pump 16, separating material conduit 18, and one or more injection ports 20. As shown in FIG. 1, the separator housing 12 is supported by a support structure including a series of transverse supports 22 connected together by longitudinal supports 24. The illustrated preferred separator housing 12 comprises an elongated conduit having a generally circular cross-section and also having a central section 26, an inlet end section 28, and an outlet end section 30. An inlet opening 32, through which bones and soft tissue (not shown) may be introduced into the housing, is formed in the inlet end 28 of the separator housing 12. An outlet opening 34 is formed at the outlet end 30 of the separator housing and is adapted to allow separated bones and other hard material (not shown) to exit the separator housing.

The screening means 14 in the preferred form of the invention comprises a series of screen openings 36 formed in the wall of the separator housing central section 26. The series of screen openings 36 preferably form a large screen area that extends around the entire perimeter of the separator housing. Each screen opening 36 is sized to allow meat and other soft tissue to pass therethrough to exit the housing 12, but to retain bones and other hard material above a certain separating size in the separator housing. For example, the preferred screen openings may be approximately 0.020 to 0.1875 inches in diameter and may be spaced approximately 0.020 to 0.5 inches apart throughout the screen area.

The separating material conduit 18 and injection ports 20 are adapted for directing a separating material (not shown) into the separator housing 12 under a desired separating pressure. The separating material injected through the conduit 18 and injection ports 20 flows over the surfaces of at least a portion of the bones and other hard material collected in the separator housing 12, pressing against the bone surfaces under the separating pressure to tear or scour any soft tissue from the bones as it passes. The separating material then carries the separated soft tissue pieces to the screen openings 36 where both the separated soft tissue pieces and the separating material may exit the housing 12 free of bones and other hard material above the particular separating size.

The preferred form of the invention includes multiple injection ports 20 at various longitudinal positions along the separator housing 12. The ports 20 may be used concurrently or may be blocked selectively by suitable blocking plugs 38 to vary the distance that the separating material must travel through the separator housing 12 to reach the screen openings 36. The injection ports 20 may be located at substantially any point along the length of the separator housing 12. For example, the separating material may be injected into the housing 12 through a portion of the screen openings. The preferred form of the invention, however, includes injection ports near the outlet end 30 of the separator housing ahead of the screen openings. This port position relative to the screen openings 36 causes the separating material to flow against the general direction of movement of the bones passing through the housing 12 and enhances the removal of soft tissue. Also, although the injection ports may extend into the housing through the housing walls, the preferred form of the invention includes an auger 40 extending through the separator housing and the injection ports 20 as well as a portion of the separating material conduit 18 extend through the auger.

The auger 40 cooperates with the housing walls and particularly the screen openings 36 formed in the housing walls to compress and convey the material contained in the separator housing 12 toward the outlet end 30 thereof. The compression of material within the separator housing 12 urges the soft tissue through the screen openings 36 formed in the housing central section 26 and thereby encourages the soft tissue to separate from the bones. Although, the bones and other material may be conveyed or pumped through the housing 12 by any means, the auger 40 is preferred because it tumbles and rearranges the material in the separator housing 12 to ensure that the separating material injected through the injection ports 20 flows over substantially all surfaces of the bones and other hard material. Also, sharpened cutting edge 42 is preferably formed along the helical periphery of the auger 40 and is adapted to scrape or cut across the screen openings 36 as the auger is rotated. The cutting edge 42 of the auger 40 cuts or otherwise removes any fibrous material (not shown) that has collected across the screen openings 36 to ensure that the screen openings remain clear for allowing soft tissue and separating material to exit the housing 12.

The apparatus, according to the invention, may be adapted to remove meat and other soft tissue from bones and other hard material of any size. However, the invention is particularly useful in removing soft tissue from larger whole bones or large bone pieces. When meat is to be separated from whole bones or large bone pieces, the housing 12 and auger 40 must be sized such that the space between adjacent auger blades 43 is large enough to accommodate the particular size of bones. For example, the distance from the root of the auger blades 43 to the housing wall may be 18 inches or more in order to accommodate beef bones.

The auger 40 is adapted to be driven by a suitable drive motor (now shown) about its longitudinal axis to perform its various functions. In the embodiment shown in FIG. 1, a portion of the auger 40 extends through the inlet end 28 of the separator housing 12 through an auger opening 44 and is connected to an inlet end extension member 46 that is supported for rotation on an inlet end bearing structure 48. A suitable sealing element 54 provides a seal between the auger opening 44 and the auger 40. At the outlet end 30 of the separator housing 12, the auger 40 extends through the housing outlet opening 34 and is connected to an elongated bone exit housing 50 that is supported for rotation by an outlet end bearing structure 52. A sealing element 56 provides a seal between the separator housing 12 and the auger 40 at the outlet opening 34. Both the inlet end and outlet end bearing structures, 48 and 52 respectively, are also supported on the longitudinal support members 24 along with the separator housing 12. The bearing structures 48 and 52 may utilize any type of precision bearing adapted to maintain the desired close tolerance between the auger 40 and the walls of the housing 12. Although single bearings 49 and 53 are illustrated in FIG. 1, it will be understood that any suitable precision bearing arrangement, such as a dual bearing structure, for example, may be employed.

In order to allow the auger 40 to compress material within the separator housing 12 and to prevent the flow of substantial amounts of separating material through the outlet end 34 of the housing, the illustrated separator apparatus includes flow restricting means comprising the elongated bone exit housing 50, an outlet passage 58 from the exit housing, and a flow controlling device 60 connected to the outlet passage. As the auger 40 is rotated about its longitudinal axis, it conveys material into the bone exit housing 50 through the outlet opening 34 of the separator housing 12. The flow controlling device 60 is operated to allow the conveyed material to build up in the bone exit housing 50 to form a thick mass of material. This thick mass of material in the bone exit housing 50 prevents substantial amounts of the separating material injected through the injection ports 20 from flowing out the outlet operating 34 of the separator housing 12 by providing a high resistance to flow relative to the path from the ports 20 to the screen openings 36. Although some separating material may exit the housing 12 through the outlet opening 34, the bulk of the separating material takes the path of least resistance and flows toward the screen openings 36 to exit the housing. The flow controlling device 60, shown schematically in FIG. 1, may comprise a suitable metering pump, a diaphragm valve or any other arrangement adapted to adjustably block flow through the outlet passage 58 of the bone exit housing 50.

As shown in FIG. 2, the soft tissue separator apparatus 10 also preferably includes a screen output collector 70, extracting means 72 for removing or extracting separating material from the material collected by the screen output collector, and a return line 74 for returning the extracted separating material to the injection pump 16 for recycling through the separator housing 12. The preferred form of the invention also includes conditioning means 76 for conditioning the extracted separating material prior to injection into the separator housing 12 so as to optimize the separating material properties for removing meat and other soft tissue from the bones in the separator housing.

The screen output collector 70 preferably comprises a suitable hopper positioned beneath the section of screen openings 36 (FIG. 1) formed in the separator housing 12. A suitable pump 78, such as a suitable positive displacement pump, is positioned in the bottom of the hopper and is adapted to convey material collected in the hopper to the separating material extracting means 72 through a suitable connecting line 80. According to the preferred form of the invention, the separating material comprises solidified oil fats rendered from fat that is removed from the bones and other hard material in the separator housing 12. In this preferred form of the invention, the separating material extracting means 72 preferably comprises a conditioning heat exchanger 82 and a suitable mechanical fat/meat separator 84. The heat exchanger 82 receives meat, fat, and the previously injected oil fats from the pump 78 and heats the mixture to a temperature sufficient for enabling the mechanical separator 84 to operate to separate the meat from the fat. The meat/fat separator preferably comprises a dairy-type separator or centrifuge adapted to separate meat from fat utilizing the difference in specific gravity between the materials. As indicated in FIG. 2, the meat from the separator 84 output is removed for further processing into commercial meat products while at least a portion of the fat from the separator 84 is returned through the return line 74 first to the conditioning means 76 and then to the injection pump 16 for reinjection into the separator housing 12.

In the preferred form of the invention where the separating material comprises rendered oil fats, the conditioning means includes a bacterial control device or system 86 and a cooling device 88 for cooling the oil fats to a desired separating consistency prior to injection back into the separator housing 12. Although the oil fats removed from the meat by the meat/fat separator 84 will itself contain little bacteria, the oil fats may be mixed with other substances such as blood and proteins that are conducive to bacterial growth. The bacterial control device or system 86 is adapted for removing the bacteria containing substances from the fat or pasteurizing the material before it is reinjected into the separator housing 12.

Once the rendered species of oil fats is suitably cleaned of bacteria or pasteurized, it is preferably cooled in the cooling device 88 to optimize the consistency of the material for performing its meat and soft tissue separating function within the separator housing 12. Rendered oil fat has the particular advantage of congealing to a relatively hard and grainy consistency at temperatures below normal atmospheric temperatures but above freezing. This thick and grainy consistency enhances the ability of the material to scour the surface of the bones and other hard material within the separator housing 12 to tear away or otherwise remove any meat or other soft tissue that may be attached to the bones or other hard material. For example, when the apparatus is used to separate beef from beef bones, the rendered oil fats or tallow may be cooled to approximately 35° F. by the device 88, although higher temperatures may be used to improve pumpability.

According to the method of the invention and operation of the apparatus 10, the bones and other hard material with meat and other soft tissue attached thereto (not shown) are first positioned in the separator housing 12, preferably through the inlet opening 32. Once the bones and attached soft tissue are positioned within the separator housing 12, the method and operation continues with the step of injecting the desired separating material (not shown) into the separator housing 12 so that the separating material flows over the surfaces of the bones and other hard material under a desired separating pressure to scour the surfaces and tear away the meat and other soft tissue remaining attached to the bone surface. The injected separating material travels through the separator housing 12 over the bone and other hard material surfaces and exits the separator housing through the screen openings 36 carrying with it the loosened meat and other soft tissue.

Although the method of the invention may be performed as a batch process, the preferred method is a continuous process in which bones having soft tissue attached thereto are continuously supplied into the separator housing 12 while the separating material is injected to remove meat and other soft tissue from the bones. The apparatus shown in FIG. 1 is particularly adapted for continuous operation with the auger 40 serving to continuously convey material through the separator housing 12 from the inlet end 28 to the outlet end 30. In this preferred continuous operation form of the invention, the separating material injecting pressure is a pressure just high enough to cause the separating material to flow out through the screen openings 36. This pressure may be in a range from 400 to 800 psi depending upon the size and quantity of screen openings 36 and the auger 40 speed.

In the preferred continuous operation form of the invention, the method also includes the step of restricting the flow of material out the outlet end 30 of the separator housing 12 through the outlet opening 34. This restricting step helps direct the separating material in the desired direction of flow from the injection ports 20 to the screen openings 36 and substantially prevents the flow of separating material out of the outlet opening 34 in the outlet end 30 of the separator housing 12. In the form of the invention shown in FIG. 1, the step of restricting flow through the outlet opening 34 is performed by the combination of the elongated bone exit housing 50 and flow controlling device 60 connected to the outlet passage 58 of the bone exit housing. As the auger 40 operates to convey material through the separator housing 12, the flow controlling device 60 is operated to block the flow of material through the outlet passage 58 and allows a thick mass of bones and other material to collect within the elongated bone exit housing 50. The thick mass of bones and other material collected in the bone exit housing 50 prevents substantial amounts of the separating material from flowing from the injection ports 20 out the outlet opening 34 of the separator housing 12 and diverts the separating material toward the screen openings 36.

As the separating material and the meat and other soft tissue exits the separator housing 12 through the screen openings 36, portions of meat or other fibrous soft tissue may collect across and block some of the screen openings. In order to prevent the total blockage of the screen openings 36, the method of the invention includes scraping the screen openings periodically to cut any collected fibrous material and thus unblock the openings. The preferred scraping step is performed by the cutting edge 42, of the auger 40 as the auger rotates about its longitudinal axis.

Referring again particularly to FIG. 2, the method of the invention also preferably includes collecting meat, other soft tissue, and separating material that exits the separator housing 12 through the screen openings 36 and then extracting the separating material from the collected material for recycling through the separator housing. In the preferred form of the invention, the material exiting the separator housing 12 through the screen openings 36 is collected in a suitable hopper 70 and then pumped by the pump 78 to the heat exchanger 82 where the material is heated, and then to the mechanical separator 84 where the meat solids are removed or extracted from the separating material.

The preferred form of the invention also includes the steps of removing bacteria from the separating material or pasteurizing the separating material from the separator 84 in the bacterial control device 86 and then cooling the separating material prior to reinjecting the material back into the separator housing 12. Where the separating material comprises rendered oil fats, the cooling device 88 is adapted to cool the tallow to a thick grainy consistency below normal atmospheric temperature.

Figure 3:
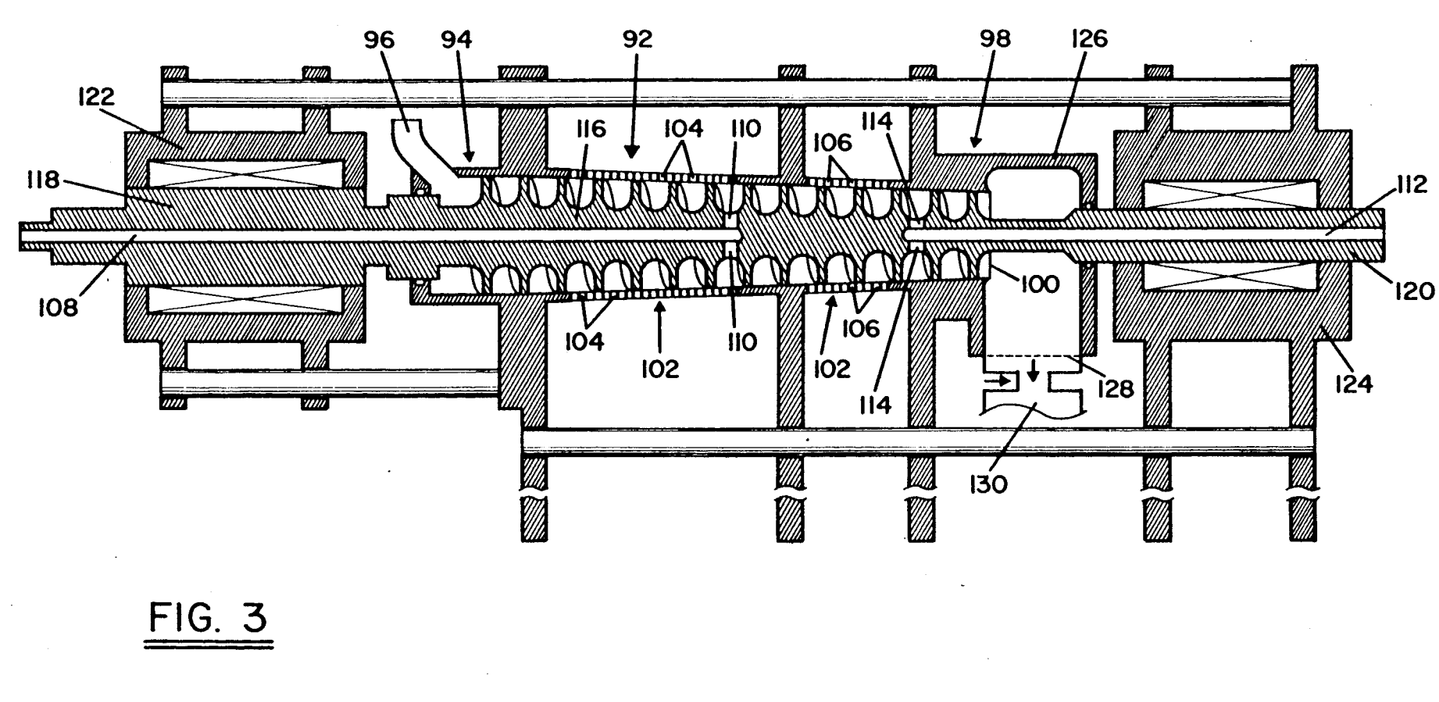
FIG. 3 is a partially schematic representational view in longitudinal section through the separator housing of a multi-stage soft tissue separating apparatus embodying the principles of the invention.
Figure 4:
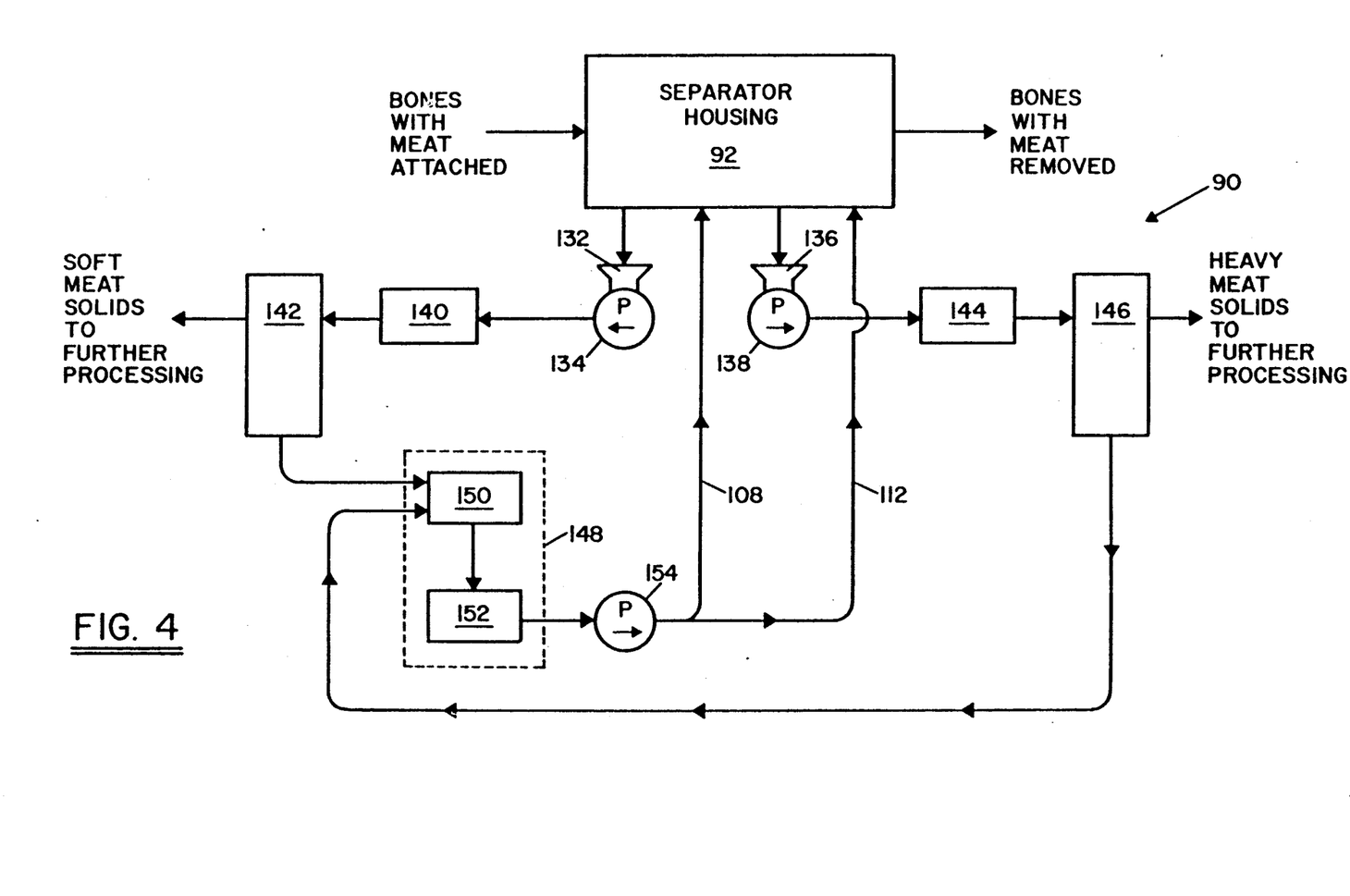
FIG. 4 is a schematic representation of a multi-stage soft tissue separating apparatus according to the invention adapted for use with the separator housing shown in FIG. 3.

FIGS. 3 and 4 illustrate a multi-stage soft tissue separating apparatus 90 embodying the principles of the invention. Similar to the embodiment shown in FIGS. 1 and 2, the multi-stage apparatus 90 includes an elongated separator housing 92 (FIG. 3) having an inlet end 94 with an inlet opening 96 through which bones and soft tissue (not shown) may enter the housing, and an outlet end 98 having an outlet opening 100 through which bones and other hard material may exit the housing. However, unlike the embodiment shown in FIGS. 1 and 2, the screening means 102 of the multi-stage apparatus 90 includes at least two separate sets of screen openings, each set at a different longitudinal position along the separator housing 92 with a space between each set. In the preferred multi-stage form of the invention, a series of first stage screen openings 104 are relatively smaller and widely spaced to allow only the softer tissue to pass therethrough along with the separating material. Second stage screen openings 106 are positioned further toward the outlet end 98 of the separator housing 92 and are larger and more narrowly spaced to allow the heavier or tougher soft tissue to pass along with the separating material.

Referring still to FIG. 3, the multi-stage form of the invention also includes two separate separating material conduits extending into the separator housing 92 to two different sets of injection ports. A first stage separating material conduit 108 feeds one or more first stage injection ports 110 positioned near the end of the first stage screen openings 104 toward the outlet end 98 of the separator housing 92. A second stage separating material conduit 112 feeds one or more second stage injection ports 114 positioned in the separator housing 92 near the outlet end thereof and generally near the end of the second stage screen openings 106. Although a single separating material conduit may feed both sets of injection ports, the separate conduits allow the use of different separating materials, different separating material consistencies, or different separating pressures in the different separator housing stages.

The apparatus shown in FIG. 3 also includes an auger 116 for conveying material through the separator housing 92 toward the outlet opening 100. The auger 116 is connected on either end to extensions 118 and 120 and is supported on bearing structures 122 124 similar to the bearing structures 48 and 52 shown in FIG. 1. However, the flow restricting means shown in FIG. 3 comprises a bone exit housing 126 connected to receive bones and other hard material directly from the outlet opening 100 of the separator housing 92 rather than through the auger end openings shown in FIG. 1. Similar to the elongated bone exit housing 50 shown in FIG. 1, the bone exit housing 126 shown in FIG. 3 is adapted to collect a thick mass of bone and other material as material is conveyed by the auger 116 and as flow through an outlet passage 128 is controlled by a flow controlling device 130 which again may be a metering pump or any other variable flow restricting arrangement.

Referring now to FIG. 4, the multi-stage separator apparatus 90 also includes a first stage screen collector 132 and conveying pump 134 for collecting material from the first stage screen openings 104, (FIG. 3) and a separate second stage screen collector 136 and pump 138 adapted to receive the material exiting the separator housing 92 through the second stage screen openings 106 (FIG. 3). The first stage pump 134 directs the collected material to a first stage separating material extracting arrangement preferably including a heat exchanger 140 and meat/fat separator 142. Similarly, the second stage collector pump 138 directs its collected material to a second stage extracting arrangement comprising a heat exchanger 144 and a mechanical meat/fat separator 146. The softer separated meat exits the apparatus from the first stage meat/fat separator 142 while the relatively heavier or tougher soft tissue exits the apparatus from the second stage meat/fat separator 146. At least some of the rendered oil fats from either or both of the meat/fat separators 142 or 146 is directed to conditioning means 148 which comprises a bacterial control system 150 and a cooling apparatus 152 similar to the conditioning means 76 previously described with reference to FIG. 2. Injection pump 154 receives the conditioned separating material and is adapted to inject the material back into the separator housing 92 through the first and second stage separating material conduits 108 and 112, respectively.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for removing meat and other soft tissue from bones, the apparatus comprising:

(a) a separator housing adapted to receive bones having meat and other soft tissue attached thereto;
(b) screening means associated with the separator housing for retaining the bones in the separator housing while enabling meat and other soft tissue to pass therethrough to exit the separator housing;
(c) compressing means for compressing the bones, meat, and other soft tissue within the separator housing so as to urge the meat and other soft tissue through the screening means without substantially breaking the bones; and
(d) separating material injecting means for injecting a separating material into the separator housing under a desired separating pressure so that the separating material flows over at least a portion of the bones received in the separator housing and out of the separator housing through the screening means, the separating material separating meat and other soft tissue from the bones as it flows over the surface of the bones under the desired separating pressure.

2. The apparatus of claim 1 wherein the injecting means includes:

(a) a separating material conduit connected to at least one separating material injection port through which separating material may enter the separator housing; and
(b) a separating material pump for pumping separating material into the separator housing through the separating material conduit and injection port.

3. The apparatus of claim 2 further comprising:

(a) screen output collecting means for collecting the meat, other soft tissue, and separating material that exits the separator housing through the screening means;
(b) separating material extracting means for removing at least some of the separating material from the meat and other soft tissue collected by the screen output collecting means; and
(c) separating material return means for returning the separating material removed from the material collected by the collecting means to the separating material conduit.

4. The apparatus of claim 2 wherein the separating material is rendered oil fat and including:

(a) conditioning means for removing bacteria from the rendered oil fat and for cooling the rendered oil fat to a desired separating consistency prior to entering the separator housing through the injection port.

5. The apparatus of claim 2 wherein:

(a) the separator housing comprises an elongated tubular conduit having an inlet end with an inlet opening formed therein and an outlet end with an outlet opening formed therein; and
(b) the compressing means is also adapted for transporting bones, meat, and other soft tissue through the separator housing in a direction from the inlet end to the outlet end.

6. The apparatus of claim 5 wherein the screening means includes:

(a) at least one section of screen openings formed in a center section of the elongated separator housing, the screen openings having sufficient size to enable meat, other soft tissue, and separating material to flow therethrough, but to retain bones in the separator housing.

7. The apparatus of claim 6 wherein at least one injection port is positioned near the outlet end of the separator housing.

8. The apparatus of claim 7 wherein the compressing means includes:
(a) an elongated auger extending longitudinally through the separator housing and having a cutting edge formed along its helical periphery adapted to scrape across the screen openings as the auger is rotated about its longitudinal axis.

9. The apparatus of claim 8 wherein:
(a) at least a portion of the separating material conduit extends into the separator housing through the auger; and
(b) at least one separating material injection port is formed in the auger.

10. The apparatus of claim 5 wherein the compressing means includes:
(a) flow restricting means associated with the outlet end of the separator housing for restricting the flow of material out of the separator housing through the outlet opening as the compressing means urges bones and soft tissue through the separator housing in the direction from the inlet end to the outlet end.

11. The apparatus of claim 10 wherein the flow restricting means includes:
(a) a bone exit housing connected to the outlet end of the separator housing for receiving material conveyed out of the separator housing outlet opening by the auger;
(b) an outlet passage formed in the bone exit housing; and
(c) a flow controlling device connected to the outlet passage for controlling the flow of material through the outlet passage.

12. The apparatus of claim 10 wherein the flow restricting means includes:
(a) an elongated exit housing connected to the auger near the outlet end of the housing and adapted to receive material conveyed through the separator housing by the auger;
(b) an outlet passage formed in the bone exit housing; and
(c) a flow controlling device connected to the outlet passage for controlling the flow of material through the outlet passage.

13. An apparatus for removing meat and other soft tissue from substantially whole bones, the apparatus comprising:
(a) a separator housing adapted to receive substantially whole bones having meat and other soft tissue attached thereto so that the bones, meat, and other soft tissue form a substantially continuous mass within at least a portion of the separator housing;
(b) screening means associated with the separator housing adapted for allowing meat and other soft tissue to pass therethrough to exit the separator housing while preventing substantially whole bones above a separating size to pass therethrough; and
(c) separating material injecting means for injecting a separating material into the separator housing under a desired separating pressure so that the separating material flows through the mass formed by the bones and soft tissue and out of the separator housing through the screening means, the separating material separating meat and other soft tissue from the bones as it flows over the surface of the bones under the desired separating pressure.

14. The apparatus of claim 13 wherein the injecting means includes:
(a) a separating material conduit connected to at least one separate separating material injection port through which separating material may enter the separator housing; and
(b) a separating material pump for pumping separating material into the separator housing through the separating material conduit and injection port.

15. The apparatus of claim 14 further including:
(a) screen output collecting means for collecting meat, other soft tissue, and separating material that exits the separator housing through the screening means;
(b) separating material extracting means for removing at least some of the separating material from the meat and other soft tissue collected by the collecting means; and
(c) return means for returning separating material from the separating material extracting means to the separating material pump.

16. The apparatus of claim 15 wherein the separating material is rendered oil fat and the apparatus further comprises:
(a) conditioning means for removing bacteria from the rendered oil fat and for cooling the rendered oil fat to a desired consistency before entering the separator housing.

17. The apparatus of claim 14 wherein the separator housing comprises an elongated conduit with an inlet end having an inlet opening and an outlet end having an outlet opening, and further comprising:
conveying means for conveying bones, meat, and other soft tissue through the separator housing without substantially breaking the bones.

18. The apparatus of claim 17 wherein the screening means includes:
(a) at least one area of screen openings formed in a center section of the separator housing, the area extending substantially around the entire perimeter of the separator housing.

19. The apparatus of claim 18 wherein the separating material conduit includes:
(a) at least one injection port positioned near the outlet end of the separator housing so that separating material injected through the port may flow along at least a portion of the length of the separator housing toward the inlet end of the housing in order to reach the screen openings.

20. The apparatus of claim 19 wherein:
(a) the conveying means includes an elongated auger having a cutting edge formed on its helical periphery and adapted to scrape against the screen openings as the auger is rotated about its longitudinal axis to convey bones, meat, and other soft tissue through the separator housing; and
(b) a portion of the separating material conduit extends into the separator housing through the auger and at least one injection port is formed in the auger.

21. The apparatus of claim 17 further comprising:
(a) flow restricting means associated with the outlet end of the separator housing for restricting the flow of material out of the separator housing through the outlet opening.

22. The apparatus of claim 21 wherein the screening means includes:
   (a) an area of first stage screen openings formed in a center section of the separator housing; and
   (b) an area of second stage screen openings formed between the outlet end of the separator housing and the first stage screen opening, the second stage screen openings being larger and more widely spaced than the first stage screen openings.

23. The apparatus of claim 22 wherein the injecting means further comprises:
   (a) a first stage separating material conduit connected to at least one first stage separating material injection port near the first stage screen openings; and
   (b) a second stage separating material conduit connected to at least one second stage separating material injection port near the second stage screen openings.

24. A method for removing meat and other soft tissue from substantially whole bones, the method comprising the steps of:
   (a) positioning bones having meat and other soft tissue attached thereto in a separator housing, the separator housing having screening means adapted to retain the bones over a desired separating size within the housing while allowing the meat and other soft tissue to pass therethrough to exit the housing; and
   (b) injecting a separating material under a desired separating pressure into the separator housing so that the separating material flows over at least a portion of the bones in the separator housing and exits the separator housing through the screening means, the separating material separating meat and other soft tissue from the bones as it flows over the surface of the bones under the separating pressure, and carrying the meat and soft tissue to the screening means.

25. The method of claim 24 further comprising the step of:
   (a) compressing the bones, meat, and other soft tissue within the separator housing so as to urge the meat and other soft tissue out of the separator housing through the screening means, without substantially breaking the bones contained in the separator housing.

26. The method of claim 24 further comprising the step of:
   (a) pumping the separating material into the separator housing through a suitable separating material conduit and injection port.

27. The method of claim 26 further comprising the steps of:
   (a) collecting meat, other soft tissue, and separating material as it exits the separator housing through the screening means;
   (b) removing at least a portion of the separating material from the meat and other soft tissue collected from the screening means; and
   (c) returning the removed portion of the separating material to the separating material conduit for reinjection.

28. The method of claim 27 wherein the separating material is rendered oil fat and including the steps of:
   (a) removing bacteria from the rendered oil fat; and
   (b) cooling the rendered oil fat to a desired separating consistency before injecting it into the separator housing.

29. The method of claim 24 wherein the separator housing comprises an elongated conduit having an inlet end with an inlet opening and an outlet end with an outlet opening and further comprising the step of:
   (a) conveying the bones, meat, and other soft tissue through the separator housing in the direction from the inlet end to the outlet end.

30. The method of claim 29 including the step of:
   (a) restricting the flow of material out of the separator housing through the outlet opening while the bones, meat, and other soft tissue are being conveyed through the housing.

31. The method of claim 30 wherein the screening means is positioned in a center section of the elongated separator housing and wherein the step of injecting the separating material into the separator housing includes:
   (a) injecting the separating material into the separator housing near its outlet end.

32. The method of claim 31 wherein the bones, meat, and other soft tissue are conveyed through the separator housing by an auger extending longitudinally therethrough, and the step of injecting the separating material into the separator housing is performed through a conduit extending into the separator housing through the auger.

33. The method of claim 32 including the step of:
   (a) periodically scrapping the screening means from inside the separator housing so as to loosen material that may have been caught in the screening means.

* * * * *